United States Patent Office 2,883,393
Patented Apr. 21, 1959

2,883,393

STABILIZED HEAT POLYMERIZABLE N-VINYL PYRROLE COMPOUNDS

Eugene V. Hort and David E. Graham, Westfield, N.J., assignors to General Aniline & Film Corporation, New York, N.Y., a corporation of Delaware No Drawing. Application October 23, 1957
Serial No. 691,785

3 Claims. (Cl. 260—315)

This invention relates to stabilized polymerizable N-vinyl pyrrole compounds, particularly N-vinylcarbazole.

Polymeric N-vinyl pyrrole compounds of the type disclosed in U.S. Patent No. 2,072,465 to Reppe et al. have many unique and valuable properties. These polymers are particularly useful in the electrical art as dielectric materials since they possess unusually high melting or softening points and have excellent electrical properties.

In many of the applications in which these polymers are employed, for example as a dielectric impregnation for radio and other electronic condensers, as a replacement for the oil or wax impregnations previously employed, it has been found to be advantageous to effect the impregnation of the condenser with the monomer of the N-vinyl pyrrole compound, preferably monomeric N-vinylcarbazole, and then effect polymerization of the monomeric compound in situ by heating. While the monomeric N-vinyl compounds have a relatively low melting point, monomeric N-vinylcarbazole for example, melts at 65° C. and flows freely, the molten monomeric N-vinyl compound polymerizes rather rapidly so that the molten monomer has a relatively short "pot life" and as a result impregnation must be effected promptly after the monomer has been melted.

Various inhibitors are known for inhibiting or controlling polymerization of monomeric N-vinyl compounds; for example the alkali or alkaline earth metals, their oxides hydroxides and carbonates, heavy metals and their salts, monohydric and polyhydric alcohols and aromatic hydroxyl compounds are disclosed as polymerization retarders in Patent 2,072,465; Patent 2,414,407, Freudenberg, discloses the use of morpholine as a polymerization inhibitor and Patent 2,483,962, Barnes, discloses stearyl alcohol as polymerization inhibitor. Most of these prior art polymerization inhibitors, however, have an adverse effect on the electrical properties of the polymer which is obtained due to the presence in the inhibitor of electronegative atoms such as oygen, nitrogen or sulfur.

We have now found that polynuclear aromatic hydrocarbons, particularly anthracene and compounds containing the anthracene nucleus such as naphthacene, other benzanthracenes and their homologs and also phenanthrene serve as excellent polymerization retarders or inhibitors for monomeric N-vinyl pyrrole compounds, particularly monomeric N-vinylcarbazole, which has to be melted, applied in the molten state and then polymerized in situ. Such polynuclear aromatic hydrocarbons greatly extend the "pot life" of the molten N-vinyl pyrrole monomer even in the presence of a polymerization catalyst such as organic peroxides. In addition since they are hydrocarbons they preserve the excellent electrical properties of the polymer which is obtained and permit polymerization to proceed rapidly at reasonable temperatures.

It has also been found that monomeric N-vinyl pyrrole compounds containing these stabilizers show a reduced exothermic temperature rise during polymerization. Moreover, these stabilizers are inexpensive and effective in low concentrations. Anthracene, our preferred stabilizer has a noticeable effect at about 0.1% concentration, by weight, based on the monomer and the preferred amount of stabilizer is within the range of 0.5 to 2.5% by weight of the monomer. At higher concentrations the polymerization tends to become rather sluggish. It is surprising that such polynuclear aromatic hydrocarbons would be effective stabilizers for monomeric N-vinyl pyrrole compounds since it is stated in Patent 2,072,465 that aromatic solvents are almost without effect on the speed of polymerization.

The stabilized monomeric N-vinyl pyrrole compounds of the present invention are readily prepared by merely adding to the monomeric N-vinyl pyrrole compound a minor amount, up to a few percent, of the particular aromatic polynuclear hydrocarbon, e.g. anthracene or phenanthrene, which is to be used as polymerization retarder or stabilizer and intimately mixing the stabilizer and monomer. The monomer containing an inhibitor can be melted and held in molten condition for longer periods of time at temperatures slightly above its melting point without sufficient polymerization occurring to prevent use of the molten monomer for impregnation of such articles as rolled condensers or porous materials such as paper. At the same time, polymerization of the monomer in situ in the articles impregnated therewith can rapidly be effected by heating to a slightly higher temperature e.g. temperatures within the range of 120 to 150° C., polymerization proceeding rapidly at such more elevated temperatures and with a lesser exothermic temperature rise than is the case with monomer containing no retarder or stabilizer. If desired, a small amount of polymerization catalyst such as an organic peroxide, e.g. di-t-butyl peroxide may be incorporated in the molten stabilized monomer.

The precise amount of stabilizer to be added to the monomer will depend on the specific stabilizer being employed and also on the degree of stabilization desired and the conditions of use of the monomer. The optimum amount of stabilizer for any particular batch of monomer and/or stabilizer can be determined by simple preliminary testing. As previously indicated, amounts of anthracene as low as 0.1% exert a noticeable stabilizing effect, and the preferred amount of stabilizer is within the range of 0.5 to 2.5% by weight of the monomer.

The following specific examples illustrate the present invention.

*Example 1*

In each of 4 test tubes was placed 20.0 grams of monomeric N-vinylcarbazole. To one tube (identified as tube B in the table below) there was added 0.2 grams (1% by weight) of naphthalene. To another tube (identified as tube C in the table below) there was added 0.2 gram of phenanthrene. To another tube (identified as Tube D in the table below) there was added 0.2 gram of anthracene. No addition was made to the material in the remaining tube (identified as tube A in the table below). All 4 tubes were then gradually heated in an oil bath with a constant wattage electrical heat source. After the solid was melted, 0.2 gram of di-t-butyl peroxide was added to each of the 4 tubes and the mixture stirred. The heating was continued so that the rate of temperature rise was about 2° C. per minute. The temperatures were followed in each tube until polymerization took place and a peak exothermic temperature was reached. The results are given in the following table:

| Time (Minutes) | Temperature, to nearest ° C. | | | | |
|---|---|---|---|---|---|
| | Bath | Tube A [1] | Tube B [2] | Tube C [3] | Tube D [4] |
| 0 | 108 | 100 | 100 | 100 | 100 |
| 1 | 110 | 103 | 102 | 102 | 103 |
| 2 | 113 | 105 | 104 | 104 | 105 |
| 3 | 115 | 108 | 107 | 107 | 108 |
| 4 | 117 | 111 | 110 | 110 | 110 |
| 5 | 119 | 115 | 112 | 112 | 112 |
| 6 | 121 | 120 | 116 | 114 | 114 |
| 7 | 122 | 127 | 122 | 116 | 116 |
| 8 | 124 | 235 | 243 | 119 | 118 |
| 9 | 126 | | | 122 | 120 |
| 10 | 128 | | | 127 | 123 |
| 11 | 129 | | | 133 | 125 |
| 12 | 131 | | | 230 | 126 |
| 13 | 132 | | | | 128 |
| 14 | 134 | | | | 130 |
| 15 | 136 | | | | 132 |
| 16 | 137 | | | | 134 |
| 17 | 139 | | | | 136 |
| 18 | 140 | | | | 138 |
| 19 | 141 | | | | 140 |
| 20 | 143 | | | | 142 |
| 21 | 144 | | | | 145 |
| 22 | 145 | | | | 148 |
| 23 | 147 | | | | 152 |
| 24 | 148 | | | | 160 |
| 25 | | | | | 247 |

[1] Tube A—Unstabilized.
[2] Tube B—Naphthalene added.
[3] Tube C—Phenanthrene added.
[4] Tube D—Anthracene added.

*Example 2*

Rolled radio condensers were exhausted in the usual manner in a vacuum chamber. The vacuum was broken by admitting molten vinylcarbazole which contained 1% by weight of anthracene and 1% by weight of di-t-butyl peroxide at a temperature of 70° C. and the condensers impregnated with the molten monomer in the usual manner. After the condensers had been impregnated, the molten monomer was permitted to drain from the impregnating tank and return to a storage tank. The impregnated condensers were then heated to a temperature of 150° C. in an oven maintained at this temperature for 30 minutes. At the end of this period, the monomer had completely polymerized. The molten monomer in the storage tank was used to impregnate a large number of charges in the vacuum impregnation chamber and sufficient fresh monomer containing 1% anthracene and 1% di-t-butyl peroxide was added to the molten monomer as needed to make up for that used in the impregnation. No noticeable polymerization of the molten monomer in the storage tank could be detected after several days operation.

It is to be understood that the foregoing examples illustrate the best mode contemplated by us of carrying out this invention. However, modifications therein will suggest themselves to those skilled in the art and permissible variations have heretofore been indicated in this specification. The nuclear aromatic hydrocarbons which we have found to be useful as stabilizers for N-vinyl pyrrole compounds are those which contain at least 3 condensed benzene rings. It will be understood that while N-vinylcarbazole is the preferred N-vinyl pyrrole compound, that the foregoing stabilizers are also effective for stabilization of other polymerizable N-vinyl pyrrole compounds containing the pyrrole ring such as N-vinyl pyrrole, N-vinyltetracarbazole, N-vinylpropylcarbazole, N-vinylindole and N-vinylnapthocarbazole.

We claim:

1. A heat polymerizable N-vinylcarbazole composition which is stabilized to polymerization in the molten state at temperatures slightly above its melting point but which may readily be polymerized by heat at temperatures above 100° C., which comprises N-vinylcarbazole containing an effective amount up to about 2.5% of a polynuclear aromatic hydrocarbon, selected from the group consisting of anthracene, benzanthracene and phenanthrene, to stabilize said N-vinylcarbazole at temperatures slightly above its melting point.

2. The composition as defined in claim 1 wherein the polynuclear aromatic hydrocarbon specified is anthracene.

3. The composition as defined in claim 1 wherein the polynuclear aromatic hydrocarbon specified is phenanthrene.

No references cited.